US009661800B2

(12) United States Patent
Buell et al.

(10) Patent No.: US 9,661,800 B2
(45) Date of Patent: May 30, 2017

(54) INDEPENDENTLY AUTOMATED MECHANICAL TRANSPLANTER

(71) Applicant: Greenheart Farms, Inc., Arroyo Grande, CA (US)

(72) Inventors: Hoy Buell, Arroyo Grande, CA (US); Dave Halley, Los Osos, CA (US); John B. Witmer, Arroyo Grande, CA (US)

(73) Assignee: Greenheart Farms, Inc., Arroyo Grande, CA (US)

( * ) Notice: Subject to any disclaimer, the term of this patent is extended or adjusted under 35 U.S.C. 154(b) by 57 days.

(21) Appl. No.: 14/723,228

(22) Filed: May 27, 2015

(65) Prior Publication Data

US 2015/0342112 A1    Dec. 3, 2015

Related U.S. Application Data

(63) Continuation of application No. 62/003,501, filed on May 27, 2014.

(51) Int. Cl.
*A01C 11/02*    (2006.01)

(52) U.S. Cl.
CPC ............ *A01C 11/02* (2013.01); *A01C 11/025* (2013.01)

(58) Field of Classification Search
CPC ................................ A01C 11/02; A01C 11/025
USPC .................................................. 111/104, 105
See application file for complete search history.

(56) References Cited

U.S. PATENT DOCUMENTS

| 4,660,479 A * | 4/1987 | Crisio, Jr. ............... A01C 11/02 111/105 |
| 4,854,802 A * | 8/1989 | deGroot ............... A01C 11/025 111/105 |
| 6,080,951 A * | 6/2000 | Thijssen ................ A01G 9/086 111/104 |
| 6,591,766 B2 * | 7/2003 | Williames ............ A01C 11/025 111/105 |
| 7,316,189 B2 * | 1/2008 | Fountain .............. A01C 11/025 111/105 |
| 7,866,087 B2 * | 1/2011 | Sluiter ................. A01C 11/025 47/1.01 P |
| 7,905,186 B2 * | 3/2011 | Faulring .............. A01C 11/025 111/105 |

(Continued)

FOREIGN PATENT DOCUMENTS

FR    2987222    *    2/2012    ............ A01C 11/02

*Primary Examiner* — John G Weiss
(74) *Attorney, Agent, or Firm* — LaRiviere, Grubman PC

(57) ABSTRACT

An independently automated mechanical transplanter for dispensing seedlings into a furrow located in the ground or in a field. The transplanter includes at least one automated transplanter unit mounted to a transportable frame. A trundle is mounted to the transportable frame having a plurality of gripper fingers. Each automated transplanter unit has a seedling tray for presenting a plurality of seedlings to the trundle to grip and extract the seedlings from the seedling tray. The transplanter also includes a moveable conveyor belt having a plurality of pockets attached thereto; the trundle configured to transfer the plurality of seedlings into the plurality of pockets as the conveyor belt moves; and each individual pocket configured to open when positioned directly over a delivery chute for dropping the seedlings into a planting shoe for delivery into the open furrow.

18 Claims, 7 Drawing Sheets

(56) References Cited

U.S. PATENT DOCUMENTS 8,122,838 B2* 2/2012 Faulring .............. A01C 11/025
  111/105

* cited by examiner

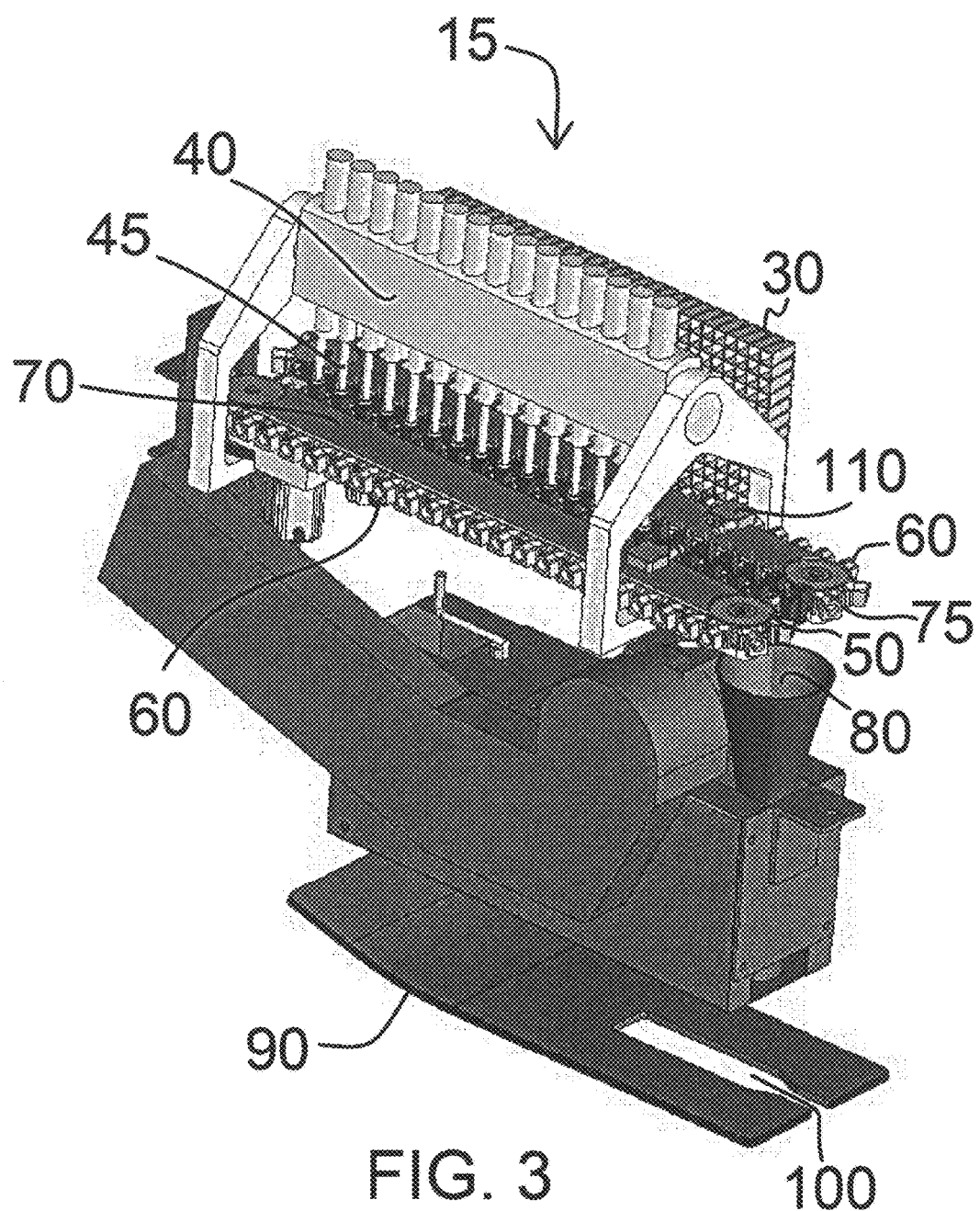

INDEPENDENTLY AUTOMATED MECHANICAL TRANSPLANTER

PRIORITY CLAIM

This non-provisional application claims priority to provisional patent application Ser. No. 62/003,501, entitled "An Independently Automated Mechanical Transplanter", filed on May 27, 2014.

TECHNICAL FIELD

The present invention relates generally to mechanical seedling transplanters. More specifically, the present invention relates to mechanical seedling transplanters assembled to be independently automated, meaning mechanically autonomous per singly line being transplanted.

BACKGROUND OF THE INVENTION

This invention is an apparatus for planting seedlings in soil in commercial growing fields, namely mechanical transplanter devices which are generally well known in the art. Typically, mechanical seedling transplanters include a furrow opener or planting shoe device that opens a furrow in the ground as the transplanter moves through a field. The transplanter continuously drops seedlings into the open furrow, and then closes the furrow and compacts the soil around the seedling after the seedling has been deposited in the ground. Also, because seedling transplanters must be able to accommodate a variety of plant types, each of which may require different spacing between the seedlings, the transplanter must be adjustable so that the seedlings will be spaced apart at specific predetermined intervals along the path of the transplanter.

Most prior art transplanters utilize a rotating tray having a series of hinged funnels or cups that open and drop the seedlings into a delivery chute that leads to the furrow opened by a plow or shoe carried by the transplanter. A major problem with prior art mechanical transplanters is that these apparatuses are labor intensive requiring many workers to operate them which can be very expensive. For instance, many workers are required to operate rotating seedling trays, and then these workers will have to manually drop seedlings from the rotating trays into the delivery chute, and then these seedlings will subsequently be transferred into the open furrow in the ground. When the seedling enters the furrow, a reciprocating stabilizing member or "kicker" swings into place and momentarily supports the seedling while the soil is compacted around it. The kicker then swings out of the way so that the next seedling can enter the furrow. The action of the kicker and the opening of the hinged cup typically are synchronized by a system of gears or chains, all of which is normally driven by a Power Take Off Unit (PTO) or hydraulics connected to the tow tractor that pulls the transplanter through the field.

Accordingly, there exists a need for an improved mechanical transplanter that is assembled to be independently automated in order to eliminate the need for manual labor, and thus reducing labor expenses.

BRIEF SUMMARY OF THE INVENTION

One aspect of the present invention is to provide an independently automated mechanical transplanter unit that reduces the need for manual labor.

Another aspect of the present invention is to provide an independently automated mechanical transplanter unit for planting seedlings at a desired interval because of the speed of the tractor and/or the topography of the field.

An additional aspect of the present invention is to provide an independently automated mechanical transplanter unit that removes small plants (seedlings) from any seedling tray with individual cells.

A further aspect of the present invention is to provide an independently automated mechanical transplanter unit that dispenses plug seedlings or individual cell seedlings into one single delivery position and into a single field row transplanting machine.

An additional aspect of the present invention is to provide an independently automated mechanical transplanter assembly for transplanting seedlings into open furrow in the ground comprising at least one automated transplanter unit mounted on a transportable frame to move the transplanter relative to the furrow into which seedlings are to be planted; a trundle mounted on the transportable frame having a plurality of gripper fingers; each automated transplanter unit having a seedling tray for presenting a plurality of seedlings to the trundle gripper fingers to grip and extract the seedlings from the tray and having a delivery chute and a planting shoe; a moveable conveyor belt mounted on the transportable frame and having a plurality of pockets attached thereto; the trundle configured to transfer the plurality of seedlings into the plurality of pockets as the conveyor belt moves relative to the trundle; and each individual pocket configured to open when positioned directly over the delivery chute for dropping the seedlings into the planting shoe for delivery into the open furrow.

A further aspect of the present invention is a method for transplanting a plurality seedlings into an open furrow in the ground, the method comprising the following steps of moving at least one automated transplanter unit relative to the ground or a field into which seedling are to be planted; presenting the seedlings to a trundle having a plurality of gripper fingers to grip and extract the seedlings from the tray; transferring the seedlings into a plurality of pockets attached to a moveable conveyer belt; opening each individual pocket when positioned directly over a delivery chute; and dropping the seedlings into a planting shoe for delivery into the open furrow.

Accordingly, for a better understanding of the invention, its functional advantages and the specific objects attained by its uses, reference should be made to the accompanying drawings, claims and descriptive matter in which there are illustrated preferred embodiments of the invention.

BRIEF DESCRIPTION OF THE DRAWINGS

FIG. 3 is a perspective view of an automated mechanical transplanter unit with the trundle and gripper fingers configured in a vertical position for placing seedlings into a plurality of pockets attached to a conveyor belt that will replace a single transplanter unit as shown in FIG. 1.

DETAILED DESCRIPTION OF THE INVENTION

The following detailed description is of the best currently contemplated modes of carrying out various embodiments of the invention. The description is not to be taken in a limiting sense, but is made merely for the purpose of illustrating the general principles of the invention, since the scope of the invention is best defined by the appended claims.

The present invention is an apparatus for planting seedlings into a growing field. To be more specific, this invention relates to an automated mechanical transplanter apparatus configured in an independent automated assembly that dispenses plug seedlings or single cell seedlings into one single delivery position and into a field row transplanting machine. The apparatus is towed by a tractor which is not illustrated or described herein since tractors come in a large variety of configurations and are common farm equipment.

Figure 1:
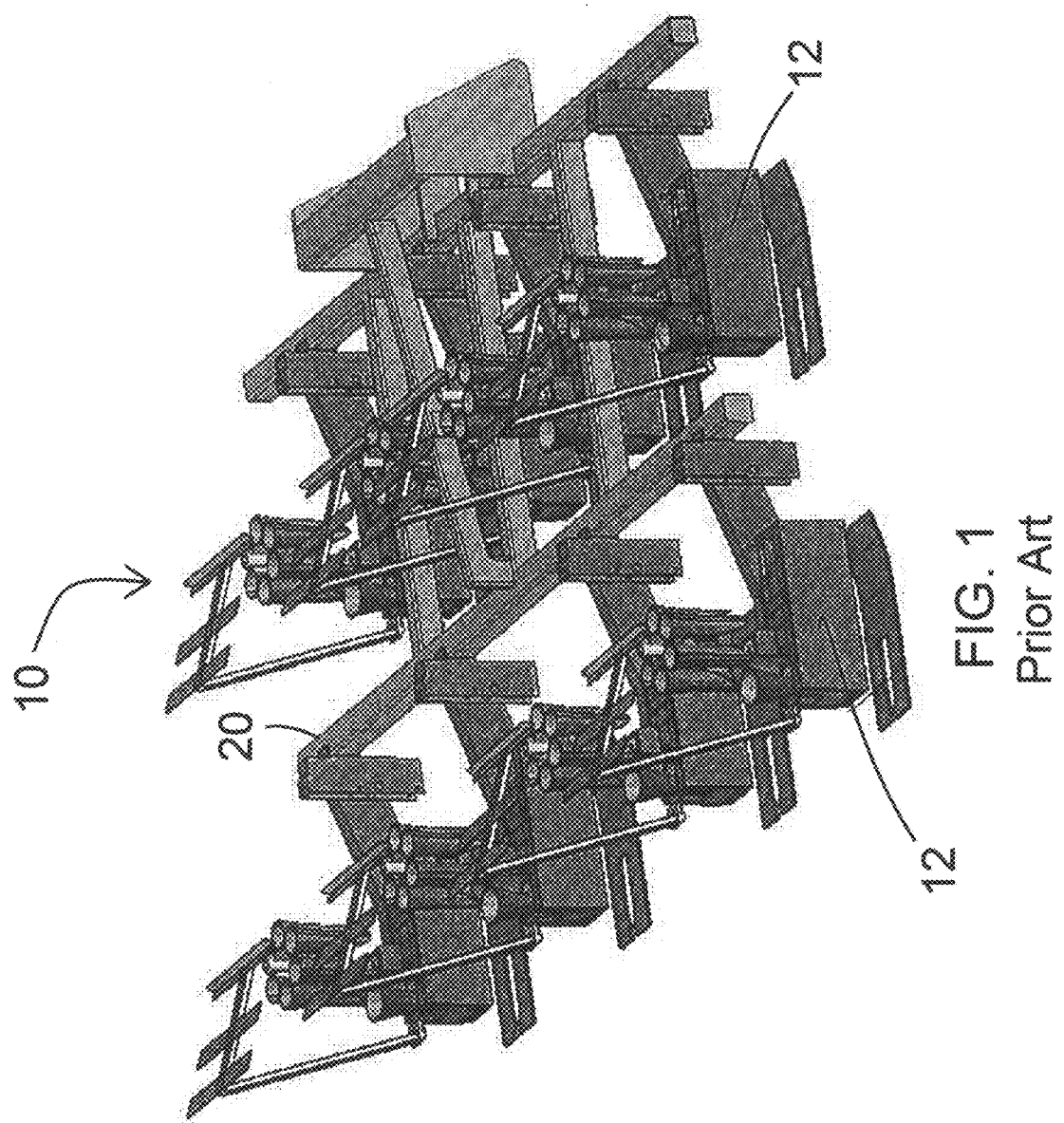
FIG. 1 is a perspective view of the prior art illustrating a mechanical transplanter having 8 separate planting units arranged in 4 double-line rows mounted to a frame.

Referring now to the drawings, FIG. 1 refers to the prior art illustrating a plurality (8 units) of mechanical transplanter units 12 mounted to a frame 20 which comprises a mechanical transplanter apparatus indicted by reference numeral 10 which is towed by a tractor or similar means (not shown). The present invention replaces the plurality of mechanical transplanter units 12 with a plurality of independently automated mechanical transplanter units 15 which are fully automated. In other words, the new apparatus 10 includes a plurality of automated units 15 mounted to the frame 20 as depicted in FIG. 1, that is used in sets of one, two, four, six, seven, or eight towed side by side or other configuration as convenient for any given planting requirement.

Figure 2:
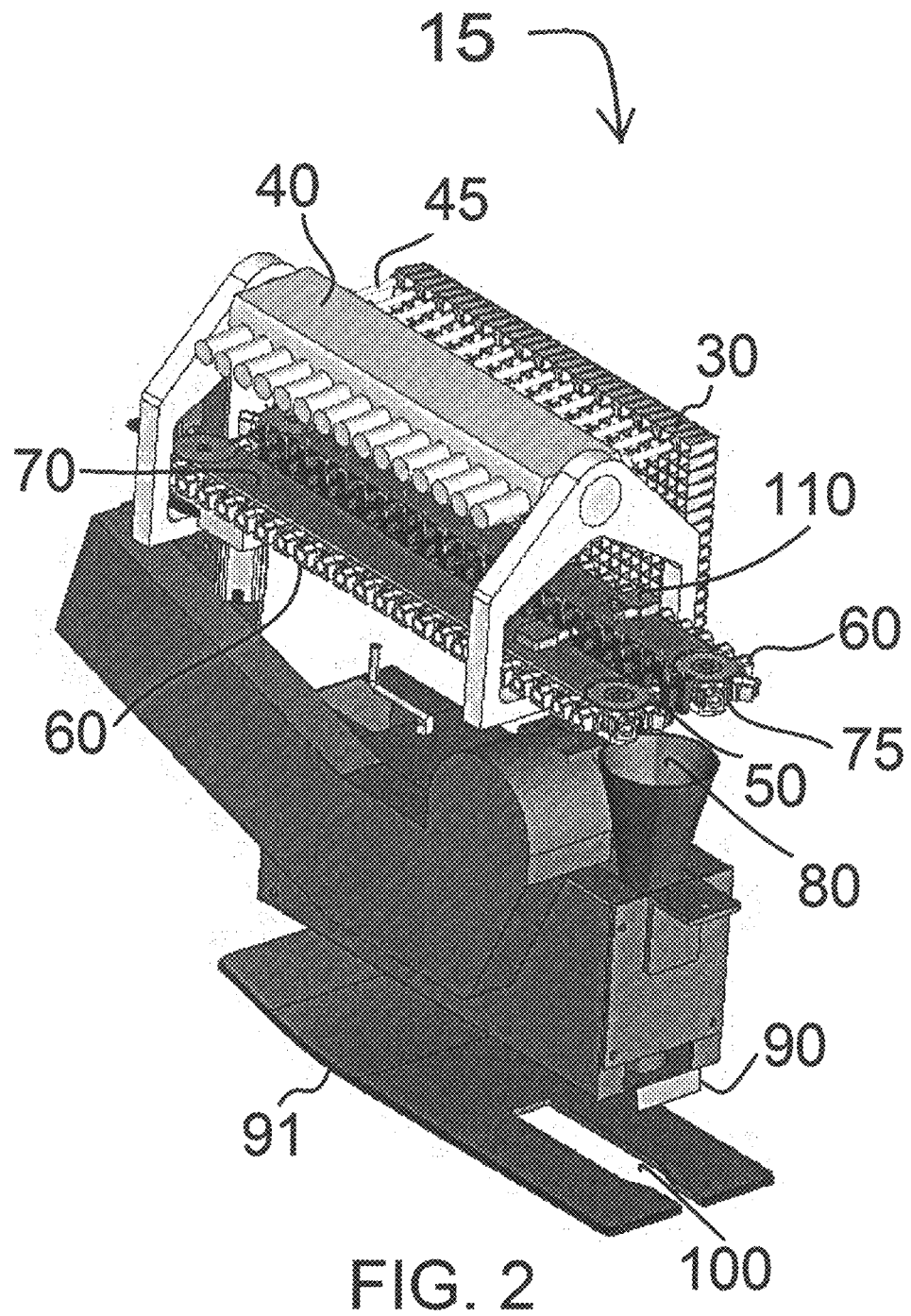
FIG. 2 is a perspective view of an automated mechanical transplanter unit with the trundle and gripper fingers configured in a horizontal position for gripping and extracting seedlings from the tray that will replace a single transplanter unit as shown in FIG. 1.
Figure 2A:
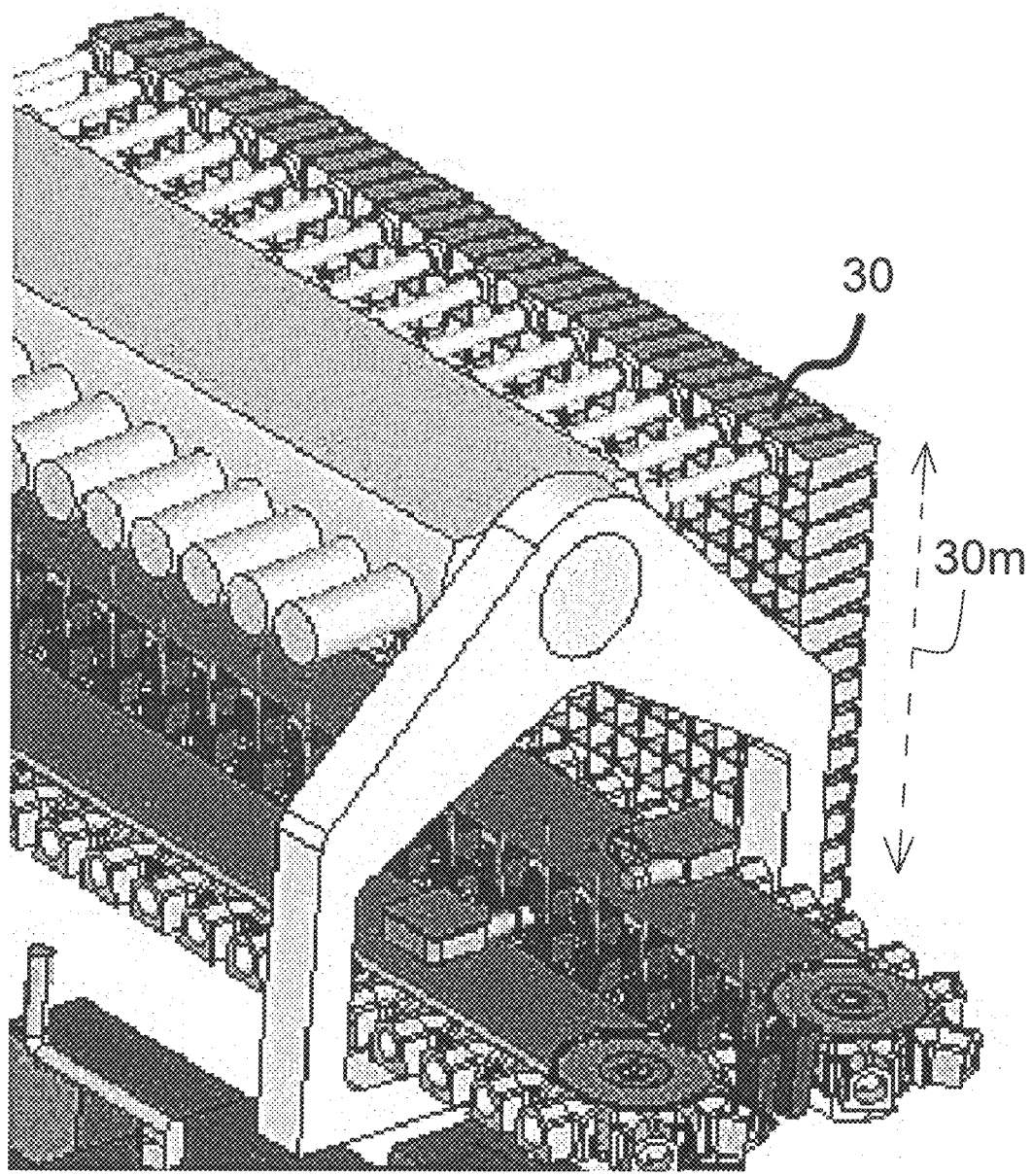
FIG. 2a is an exploded view of the seedling tray 30 shown in FIG. 2 that is configured to move vertically upward or downward 30m.

Referring now to FIGS. 2 and 2a, an automated mechanical transplanter unit 15 includes a seedling tray 30 that indexes or moves vertically upward or downward 30m relative to trundle gripper fingers 45 when positioned to extract seedlings. The tray 30 indexes vertically 30m so that a trundle 40 with its gripper fingers 45 can grip and extract seedlings 50 from the tray 30 when the gripper fingers 45 are in a horizontal position. The trundle 40 and gripper fingers 45 are configured to swing into the horizontal position for advancing in a linear motion in order to grip and extract the seedlings 50. The trundle 40 and the gripper fingers 45 remove small plants (seedlings) from any seedling tray with individual cells.

Referring now to FIG. 3, the fully automated mechanical transplanter unit 15 is configured to swing from the horizontal plane onto a vertical plane so that the seedlings 50 are placed into a plurality of pockets 60 that are attached to a conveyor belt 70. The conveyor belt 70 advances the seedlings through at least one sensor 110. If the sensor 110 senses that seedlings 50 are missing from the pockets 60, the conveyor 70 continues to advance so that seedlings drop from the conveyor belts' radius end 75 at a steady rate regardless of missing plants (seedlings), thus effectively providing 100% seedling drops into the delivery chute 80 without interruption or delay of the transplanting rate. Once the seedlings 50 drop into the delivery chute 80, they will then drop into the planting shoe 90 which contains a furrow opening 100 for opening a furrow in the ground or a field as the transplanter 10 is pulled along a path. As the seedlings fall through the planting shoe 90, they will then fall into the open furrow in the ground or field. As further shown in FIG. 3, the transplanter unit 15 also includes a sled 91 which is also referred to as a ski bottom 91.

Figure 4:
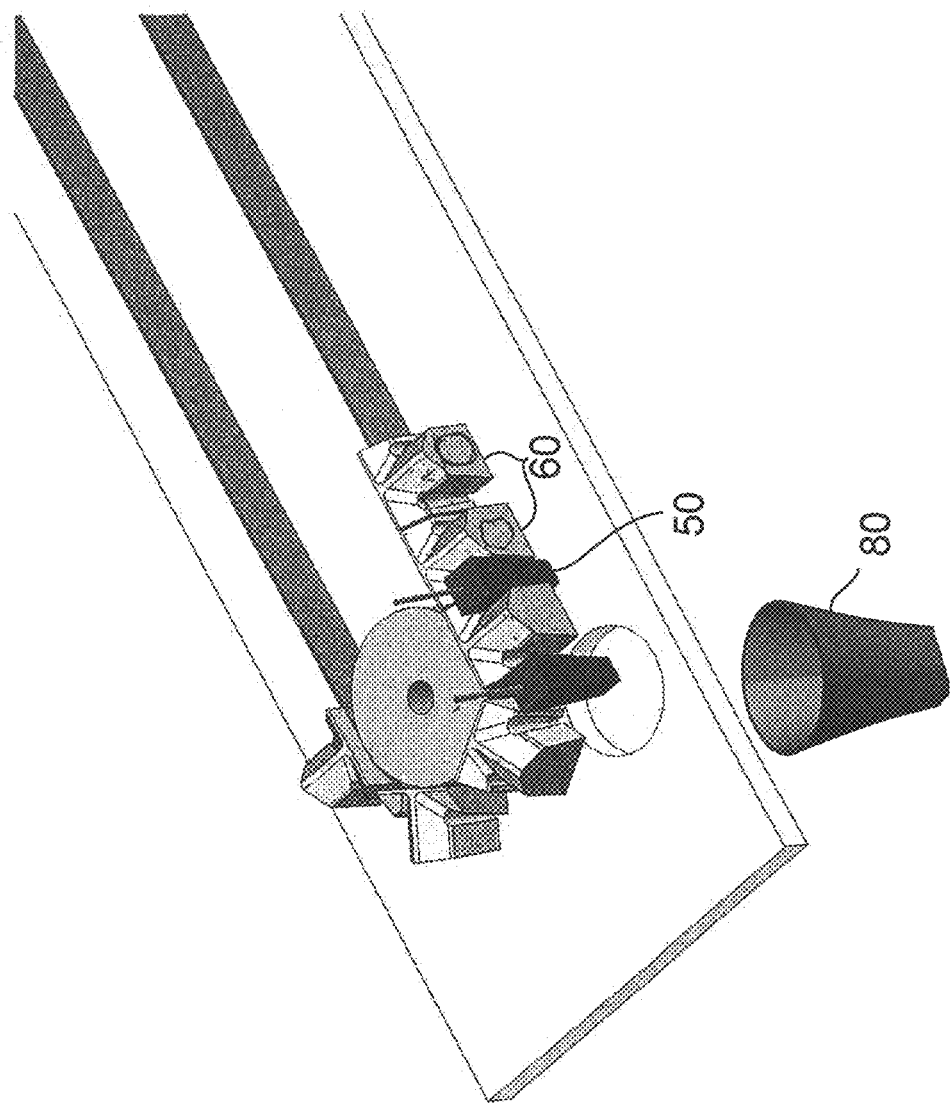
FIG. 4 is a close-up perspective view of the seedlings sitting in the pockets of the automated mechanical transplanter unit of FIGS. 2 and 3.

Referring now to FIG. 4, the conveyor belt 70 includes a plurality of specially designed pockets 60 as referenced above. The pockets 60 are specially constructed to open when positioned directly over the delivery chute 80 so that the seedlings fall through the planting shoe 90 and then into the open furrow in the ground or field.

Figure 5:
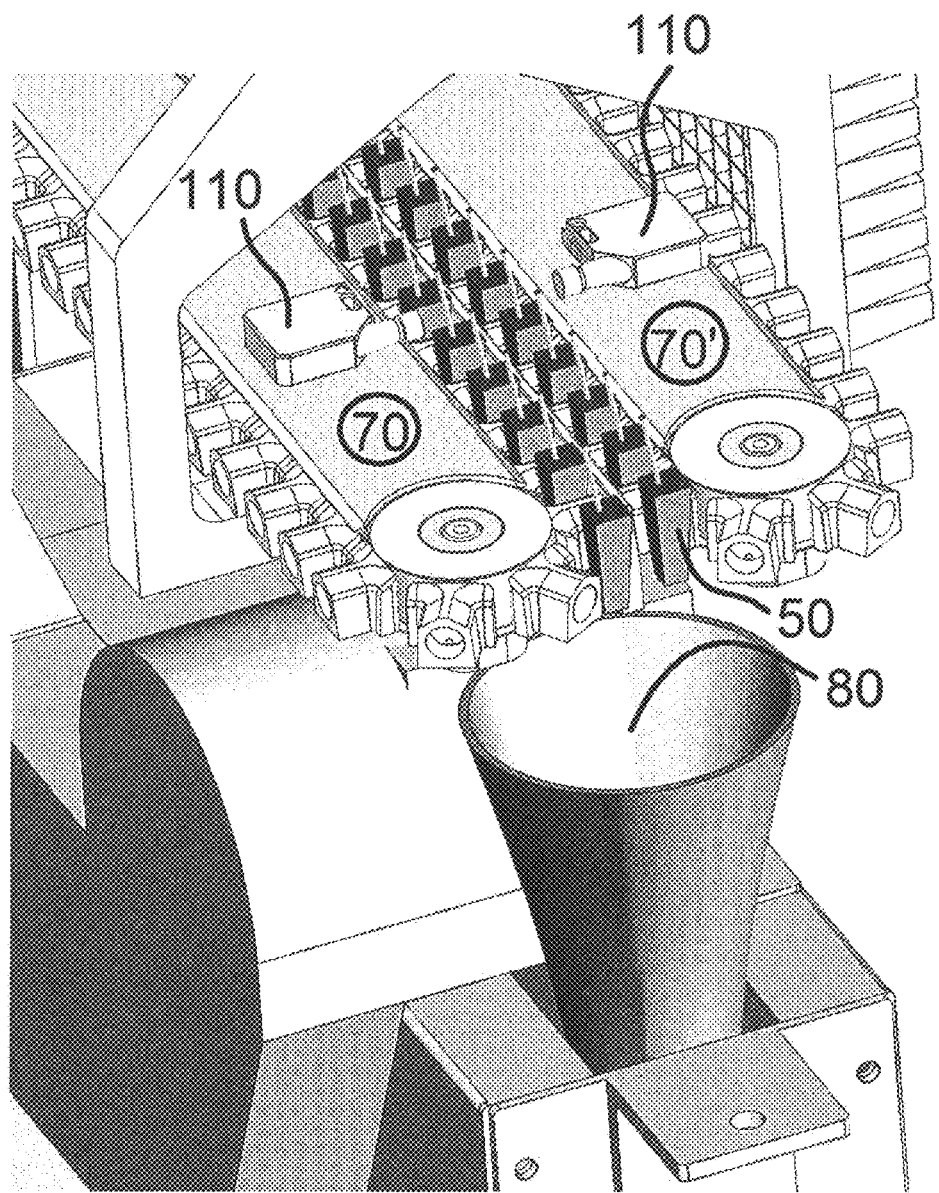
FIG. 5 is a top perspective view of an automated mechanical transplanter unit with the seedlings sitting in pockets and attached to a conveyor belt.

As shown in FIGS. 2, 3, and 5, the preferred embodiment of the invention, i.e., the automated mechanical transplanter unit 15, includes a second identical conveyor belt 70'. The second belt 70' operates alternately as the other conveyor belt 70 is being restocked with plants (seedlings), thus providing a non-stop, continuous supply of plants. Alternative embodiments of the invention include more than two conveyor belts for dispensing plug seedlings into a field row transplanting machine. Further, automated controls coordinate all of the above described mechanisms, and are adjustable as to speed and separate function integration.

Figure 6:
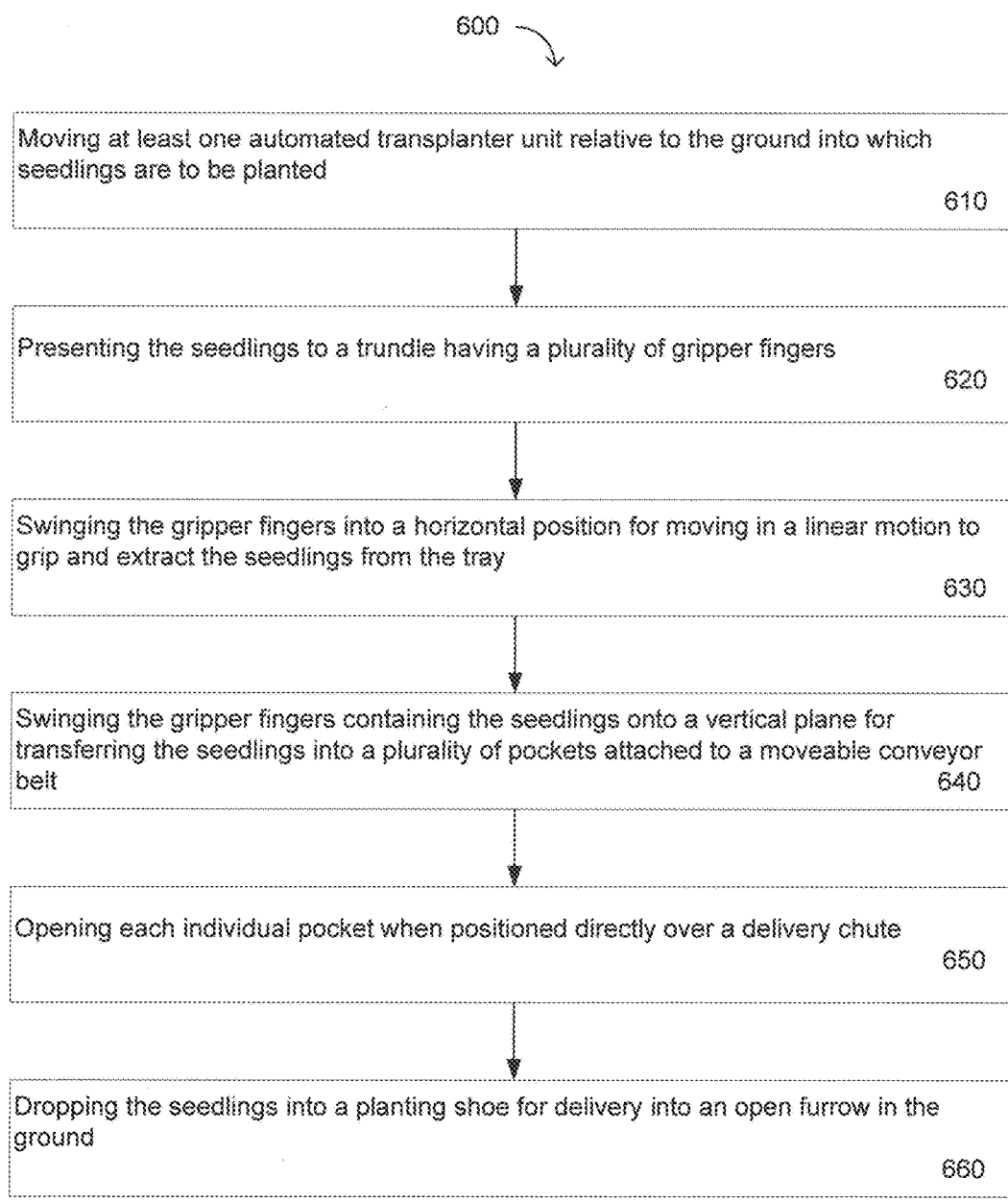
FIG. 6 represents an execution diagram for the method of transplanting a plurality of seedlings into an open furrow in the ground.

FIG. 6 refers to an execution diagram 600 for the method of transplanting a plurality of seedlings into an open furrow in the ground or field. The method comprises the steps of moving at least one automated transplanter unit relative to the ground or field into which the seedling are to be planted (610); presenting the seedlings to a trundle having a plurality of gripper fingers (620); swinging the gripper fingers into a horizontal position for moving in a linear motion to grip and extract the seedlings from the tray (630); swinging the gripper fingers containing the seedlings onto a vertical plane for transferring the seedlings into the plurality of pockets that are attached to a moveable conveyor belt (640); opening each individual pocket when positioned directly over a delivery chute (650); and dropping the seedlings into a planting shoe for delivery into the open furrow (660).

It should be understood that the foregoing relates to various embodiments of the invention and that modifications may be made without departing from the spirit and scope of the invention. It should also be understood that the present invention is not limited to the designs mentioned in this application and the equivalent designs in this description, but it is also intended to cover other equivalents now known to those skilled in the art, or those equivalents which may become known to those skilled in the art in the future.

What is claimed is:

1. An independently automated mechanical transplanter unit for transplanting seedlings into an open furrow in the ground or in a field comprising:
   a trundle configured to selectively position a plurality of gripper fingers,
   a seedling tray for presenting a plurality of seedlings to the trundle gripper fingers to grip and extract the seedlings from the seedling tray, the seedling tray being configured to move vertically upward or downward relative to the trundle gripper fingers when the gripper fingers are positioned to extract seedlings,
   a delivery chute,
   a planting shoe disposed below the delivery chute;
   a conveyor belt defined by a plurality of linked pockets configured to receive individual seedlings from the gripper fingers;

the axis of rotation of said conveyor belt being substantially perpendicular to the open furrow; and each individual pocket configured to open when positioned directly over the delivery chute for dropping a seedling therefrom into the planting shoe for delivery into the open furrow.

2. The automated mechanical transplanter unit according to claim 1, wherein the seedling tray is configured to index or align vertically for presenting the rows of seedlings to the trundle gripper fingers.

3. The automated mechanical transplanter unit according to claim 2, wherein the trundle is configured to move horizontally relative to the furrow to grip and extract the seedlings from the tray.

4. The automated mechanical transplanter unit according to claim 1, wherein the trundle is configured to move the gripper fingers containing the seedlings vertically relative to the furrow to place the seedlings into the plurality of pockets.

5. The automated mechanical transplanter unit according to claim 1, wherein the conveyor belt moves the pockets through at least one sensor for determining if said pockets contain seedlings.

6. The automated mechanical transplanter unit according to claim 5, wherein the conveyor belt is configured to move each of the plurality of pockets directly over the delivery chute for delivering a seedling at a predetermined interval according to the at least one sensor.

7. The automated mechanical transplanter unit according to claim 1, further including a second identical conveyor belt for providing a continuous supply of the seedlings.

8. The automated mechanical transplanter unit according to claim 1, wherein the seedlings are plug seedlings or individual cell seedling plants.

9. The automated mechanical transplanter unit according to claim 1, wherein the automated transplanter units can be used in sets of one, two, four, six, seven, or eight towed side by side or other configuration as convenient for any given planting requirement.

10. A method for transplanting a plurality of seedlings into an open furrow in the ground or field, the method comprising the steps of:

moving a transportable frame onto which an automated mechanical transplanter unit is mounted, and configured for aligning said transplanter with the open furrow into which the seedlings are to be planted;

moving a seedling tray vertically upward or downward for presenting the seedlings to a trundle having a plurality of gripper fingers to grip and extract the seedlings from the tray, the vertical movement of the seedling tray being relative to the trundle gripper fingers when positioned to extract said seedlings;

transferring the seedlings into a plurality of pockets attached to a conveyer belt, the axis of rotation of said conveyor belt being substantially perpendicular to the open furrow;

opening each individual pocket when positioned directly over a delivery chute; and dropping the seedlings into the delivery chute disposed over a planting shoe for delivery into the open furrow.

11. The method according to claim 10, further comprising the step of:

moving the gripper fingers into a horizontal position relative to the furrow for moving in a linear motion to grip and extract the seedlings from the tray.

12. The method according to claim 10, further comprising the step of:

moving the gripper fingers containing the seedlings onto a vertical plane relative to the furrow to place the seedlings into the plurality of pockets.

13. A system for transplanting seedlings into an open furrow in the ground or in a field utilizing a plurality of mechanisms, the system comprising:

a transportable frame;

a plurality of independently automated transplanter units mounted to the transportable frame to move each automated transplanter unit into alignment with an open furrow in the ground into which seedlings are to be planted;

each automated transplanter unit further including:

a trundle configured to have a plurality of gripper fingers, a seedling tray for presenting a plurality of seedlings to the trundle gripper fingers to grip and extract each seedling from the seedling tray, the seedling tray being configured to move vertically upward or downward relative to the trundle gripper fingers when positioned to extract seedlings, a delivery chute, a planting shoe disposed below the delivery chute, a conveyor belt defined by a plurality of linked pockets configured to receive individual seedlings from the trundle, and the axis of rotation of said conveyor belt being substantially perpendicular to the open furrow; and each individual pocket being configured to open when positioned directly over a delivery chute for dropping the seedlings into a planting shoe for delivery into an open furrow in the ground.

14. A system according to claim 13, wherein the seedling tray is mounted on the frame vertically relative to the furrow.

15. A system according to claim 14, wherein the gripper fingers move horizontally in a linear motion to grip and extract the seedlings from the seedling tray.

16. A system according to claim 13, wherein the trundle moves the gripper fingers vertically relative to the furrow to place the seedlings into the plurality of pockets.

17. A system according to claim 13, wherein the automated transplanter units can be used in sets of one, two, four, six, seven or eight towed side by side or other configuration as convenient for any given planting requirement.

18. The system according to claim 13, further comprising automated controls for coordinating the plurality of mechanisms, wherein the automated controls for coordinating the plurality of mechanisms are adjustable as to speed and separate function integration.

\* \* \* \* \*